Figure 1:
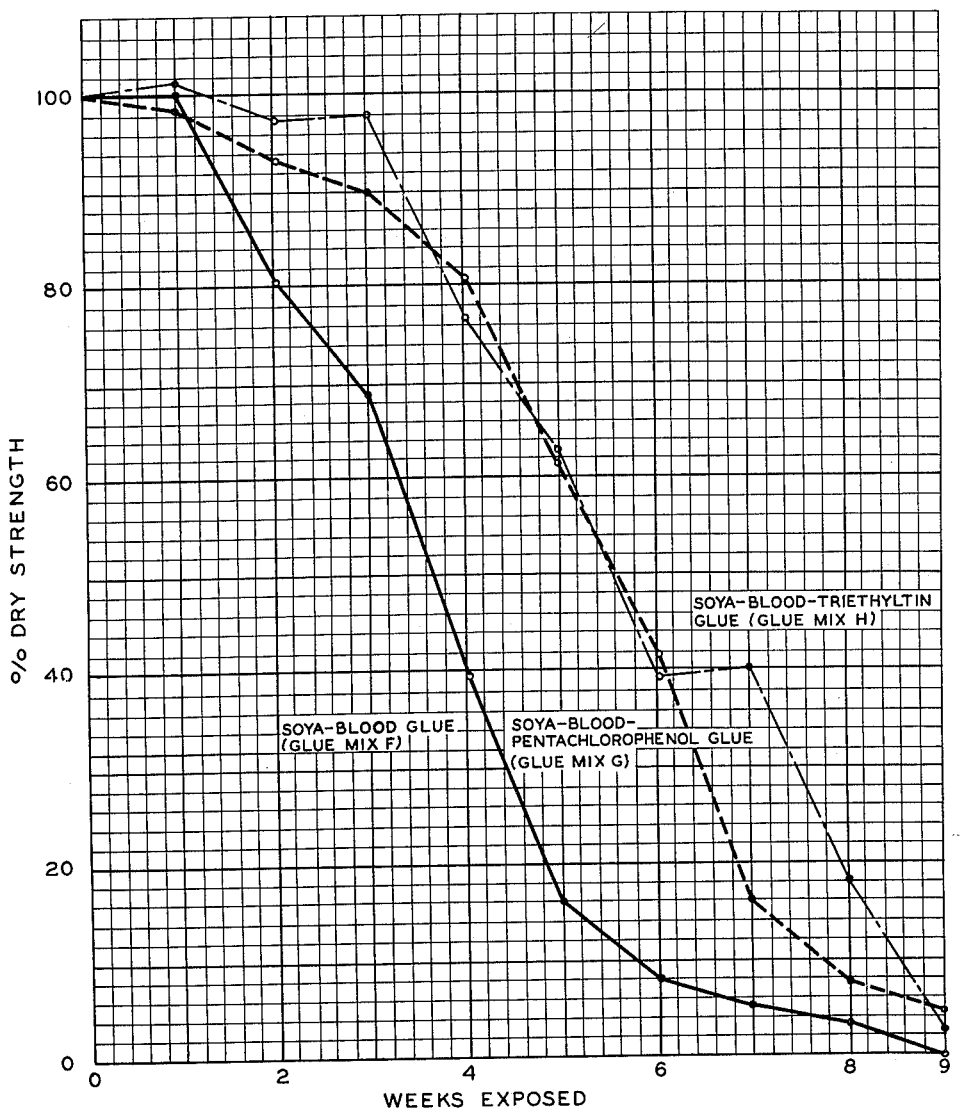

INVENTORS
HENRY W. HAIGH
WALLACE M. MORGAN

INVENTORS,
HENRY W. HAIGH
WALLACE M. MORGAN

ATTORNEY

United States Patent Office 3,019,146
Patented Jan. 30, 1962

3,019,146
PRODUCTION OF BONDED CELLULOSE UNITS
Henry W. Haigh and Wallace M. Morgan, Seattle, Wash., assignors to American-Marietta Company, Chicago, Ill., a corporation of Illinois
Filed Sept. 3, 1957, Ser. No. 681,818
21 Claims. (Cl. 154—45.9)

The present invention relates to the production of cellulose units bonded with an adhesive material having a glue base to produce a consolidated product, the glue base of which resists the growth and deteriorating effects of micro-organisms, under conditions promoting such growth, said micro-organisms including bacteria, fungi, and the like.

In the production of bonded components including cellulose articles, such as plywood and fiberboard, it is customary to add to the glue a fungicidal phenolic or chloro-phenolic compound, the fungicide most usually utilized being pentachlorophenol or a salt thereof.

However, the use of pentachlorophenol has certain disadvantages. More specifically, to provide minimum mold resistance, it is necessary to add about 4¼ pentachlorophenol based on the dry weight of the glue base. This quantity of pentachlorophenol causes severe viscosity increases in soya bean and severe decreases in viscosity of blood-soya bean glues, and of casein glues.

Glues which are severely thickened by pentachlorophenol require the addition of water to reduce the viscosity to a usable level, and usually require an adjustment of the glue spread to compensate for the additional water. This presence of additional water over that necessary to ordinarily prepare a usable glue places additional water on the glue line, which water must be eliminated as the glue sets. Glues whose viscosities have been decreased by the addition of pentachlorophenol, and particularly the blood-soya bean glues to which pentachlorophenol has been added must have a thickening agent incorporated therein to compensate for the decrease in viscosity, and this not only requires an additional step in the preparation of the glue, but is expensive.

The present invention in one of its forms is directed to bonding cellulose units with an adhesive material having a glue base to produce a consolidated product which resists the growth and deteriorating effects of microorganisms at the glue line under conditions promoting said growth, said process comprising coating at least one of two opposed surfaces of the cellulose members with an adhesive material containing an organo-tin compound having the formula $R_3SnX$ where R is a hydrocarbon radical linked directly to the tin radical by a tin-carbon bond and is selected from the group consisting of alkyl, aryl, and aralkyl radicals, and X is an anion free of any tin carbon linkage, and then consolidating the cellulose members and setting the adhesive material, thereby bonding the members one to another and protecting the set adhesive material against attack from said organisms. The radical R is preferably selected from the group of radicals consisting of hydrocarbon alkyl, aryl, alkaryl, and aralkyl radicals. Representative organo-tin compounds defined by the formula $R_3SnX$ are triethyltin hydroxide, triethyltin acetate, triethyltin phenoxide, triethyltin chloride, tributyltin acetate, triphenyltin acetate, tri-n-propyltin acetate, triisopropyltin acetate, and tri-n-hexyltin acetate.

The invention resides not only in the process of bonding cellulose units as herein set forth, but in the bonded cellulose product itself, including plywood and fibreboard.

Furthermore, the invention resides in the adhesive composition itself, that is, in an adhesive composition comprising a glue normally exhibiting in its set state, under humid conditions of use, a tendency to deteriorate, and an organo-tin fungicidal agent preventing or inhibiting said tendency to deteriorate. It has been discovered that upon the addition of an organo-tin compound to a dry glue base of the character set forth, that the resulting dry composition has an unusually good storage life. Even after storage for a period as long as six months in the dry form, the final adhesive composition produced by suspending the dry composition in a vehicle not only maintains its excellent adhesive properties, but additionally maintains the herein recited viscosity and fungicidal characteristics.

In accordance with the present invention, in the production of the consolidated cellulose unit, only relatively small amounts of the organo-tin compound is required.

Broadly, the organo-tin compound is present in the adhesive material in an amount between the limits of about 0.01% and about 2%, and more narrowly between the limits of about 0.01% and about 0.5%, said percentages being taken on the dry weight of the glue base.

In the present invention, not only is the deterioration of the glue line of the cellulose unit prevented under conditions promoting said deterioration, but the present invention affords a substantial advantage in that it is not necessary to add a viscosity compensating agent to the adhesive composition so that the latter will stay on the glue line, and simultaneously provides an adhesive which will have the proper spreading characteristics, and will not require the elimination of substantial amounts of water as the adhesive composition or glue sets.

The present invention is applicable to many different kinds of adhesive compositions.

The invention is particularly applicable to the production of consolidated cellulose or lignocellulose products bonded with a protein adhesive composition. As representative of protein bases which may be used, there is set forth casein, vegetable proteinaceous flours including soya bean, peanut flour, cottonseed flour, and the like, blood, and blood-soya bean bases. The consolidated products may be inhibited against deterioration at the glue line when the bonding adhesive includes a starch base. The bonding adhesive may also have incorporated therein a substantial portion of a resin material, as for example, a urea-aldehyde resin, and more specifically, a urea-formaldehyde resin.

The following is a specific example illustrative of the present invention:

EXAMPLE 1

A soya bean flour glue base in the dry state in the amount of 400 grams was mixed for a period of about 5 minutes with 840 grams of water, preferably at 25° C. Then there was added 500 grams of water, preferably at a temperature of about 25° C., and the resulting mass was mixed for a period of 2 minutes. There was then added 50.5 grams of lime dispersed in 99.0 grams of water, and the resulting mass was mixed or agitated for a period of about 1 minute. There was then added about 72 grams of 33⅓% sodium hydroxide, the sodium hydroxide functioning as an adhesive conditioner. The resulting mass was then mixed for a period of about 1 minute and 100 grams of N-grade sodium silicate was added, and the resulting mass agitated for a period of about 1 minute. There was then added to the resulting mass 7 grams of a mixture of carbon tetrachloride and carbon bisulphide and the resulting mass was agitated for a period of about 8 minutes. The lime and the sodium silicate also act as an adhesive conditioner to improve the adhesive properties of the resulting glue composition.

There were formulated five batches of glue in accordance with the above, said batches being identified as A, B, C, D, and E. Batch A is the control batch. To batch B there was added 4¼% of pentachlorophenol. To batch C there was added 0.174% of triethyltin hydroxide. To batch D there was added 0.174% of tributyltin acetate, and to batch E there was added 0.174% of triethyltin acetate, said percentages being taken on the dry weight of the 400 grams of straight soya bean glue base in a dry state. Preferably, the amount of triethyltin hydroxide set forth is added for convenience in the form of a 4% water solution. When this is done, the amount of water in the glue composition prior to the addition of the fungicidal agent can be reduced in an amount to compensate for the water added when the triethyltin hydroxide is added in a water solution.

Each of the above batches A–E, inclusive, was tested for MacMichael viscosity and high shear viscosity one hour after mixing and again two hours after mixing. The following table sets forth the viscosities obtained:

Table 1

| Batch | Formulation | MacMichael viscosity #26 wire at time after mixing | | | High shear viscosity at time shown after mixing | | |
|---|---|---|---|---|---|---|---|
| | | Initial | 1 hr. | 2 hr. | Initial | 1 hr. | 2 hr. |
| A | Basic—non-toxic (control batch). | 100 | 133 | 147 | 4.7 | 6.1 | 6.3 |
| B | 4¼% pentachlorophenol. | 203 | [1] 400+ | [2] 400+ | 6.5 | (2) | (2) |
| C | 0.174% triethyltin hydroxide (solids basis) in 4% solution. Reduce H₂O in formula to compensate. | 94 | 133 | 152 | 4.7 | 6.5 | 6.2 |
| D | 0.174% tributyltin acetate. | 98 | 134 | 152 | 4.6 | 6.7 | 6.2 |
| E | 0.174% triethyltin acetate. | 97 | 133 | 147 | 4.7 | 6.8 | 6.2 |

[1] Readings beyond the top scale of viscosimeter.
[2] Unreadably high.

Referring to Table I it will be observed that when the glue composition had 4¼% pentachlorophenol added thereto taken on the dry weight of the soya bean glue base, that the initial MacMichael viscosity was 203. After one hour the MacMichael viscosity had increased to above 400 beyond the reading capacity of the viscosimeter, and at two hours the viscosity of the pentachlorophenol glue was still above the capacity of the reading scale of the viscosimeter.

When pentachlorophenol was added as the fungicidal agent, the initial high shear viscosity after mixing was 6.5 and after one and two hours, the viscosity had increased tremendously, being unreadable on the scale of the viscosimeter.

Batch C to which 0.174% of triethyltin hydroxide had been added, had an initial viscosity after mixing of 94; one hour after mixing the viscosity was 133, and two hours after mixing the viscosity was 152. The high shear viscosity one hour after mixing was 6.5, and two hours after mixing 6.2. It is, therefore, seen that both the MacMichael and high shear viscosities remained within a usable range for application to an object to be glued, that is, required the addition of no thinning agent. This is in distinct contrast with batch B which had been treated with pentachlorophenol which resulted in materially increasing the viscosity so as to require the addition of water to reduce the viscosity of the glue composition to a usable level. Table I also shows that comparable results were obtained using tributyltin acetate and triethyltin acetate. Therefore, the fungicidal organo-tin compound of the character set forth when added to the glue composition or adhesive composition in the amount herein set forth, does not, in general, cause any substantial viscosity changes in the adhesive composition over what said glue composition possesses when the herein set forth fungicidal agent is not added to the adhesive composition, and this is particularly true when the glue has been mixed for a period of one hour. There is some slight change in the MacMichael and high shear viscosity as shown by the above Table. After a two-hour period and after 3- and 4-hour periods there will be some further increase in the MacMichael viscosity, but these increases will not be of such a character as will require the addition of a thinning agent, such as water.

In Example 1 the soya bean flour glue base can be replaced by casein glue base, a blood base or glue composition, a blood-soya bean flour glue composition, a blood-urea-aldehyde glue base or composition, a starch glue base or composition, a starch-urea-aldehyde glue base or composition, or by a wheat flour-urea-aldehyde resin glue base or composition, and in general, by any of the prior art protein or starch glue bases or compositions with appropriate glue formulation adjustments according to base material employed. The blood glue base or glue composition may be prepared in the manner set forth in Cone application Serial No. 461,947, filed October 13, 1954, now U.S. Patent No. 2,895,928. In said application there is disclosed a process of making a blood-glue which comprises providing an aqueous blood material selected from the group of fresh blood, an aqueous solution of soluble dried blood, and mixtures thereof, the blood solids and water in said blood material varying from about 1:3 to 1:10, respectively, on a weight basis, and then coagulating the blood in said blood material while agitating it for maintaining the coagulated blood particles in finely divided condition and dispersed throughout the aqueous medium. This blood glue base may have its adhesive properties improved by mixing therewith an adhesive conditioner which may be an alkali metal caustic or a combination of alkali metal caustic, lime, and sodium silicate. In general, it is only necessary to add to the glue composition or glue base a relatively small amount of fungicidal organo-tin compound of the charcter herein set forth. The addition of between about 0.01 and 0.5% of the organo-tin compound is sufficient, said percentage being taken on the dry weight of the glue base to retard fungous growth. Satisfactory results may be obtained by the addition of an organo-tin compound of the character herein set forth in an amount of 0.01% or 0.15% or 0.3%, said precentages being taken on the dry weight of the glue base, such as a protein flour base, a protein blood base, or a starch base. In some cases up to 1% or even up to 2% may be added, said percentage being taken on the dry weight of the glue base, but usually only a small amount of the fungicidal organo-tin compound is necessary to prevent deterioration of the set glue bond by living organisms.

Glue compositions produced from batches A–E, inclusive, were used in the production of plywood and were filmed onto the core or the cross-band veneers of the plywood in amounts usually employed in the prior art.

After the application of the adhesive composition, panels were set until the glue bond was converted into its final set form.

Shear test specimens from each panel were placed in a cabinet maintained at a humidity between about 90% and about 95% and at a temperature between about 75° and about 85° F. The test specimens were laid on pieces of sap wood which had been soaked in a soya bean slurry and inoculated with mold spores. The mold growth soon covered the specimens, and at various lengths of time the specimens were withdrawn from the cabinet and tested for breaking strength. These strengths were compared to like specimens not exposed to mold attack. In general, the specific procedure employed was based primarily on the procedures described in Forest Products Laboratory Bulletin #1344, November 1950, entitled "Measuring the Mold Resistance of Protein Glues." The procedures employed in the experiments herein referred to were varied slightly from that set forth in said Bulletin in that Douglas fir plywood specimens were used instead of yellow birch, and a large mold cabinet was used instead of stone crocks or similar vessels. The inoculation and testing procedure was essentially the same as described in said Bulletin.

The following Tables II–V, inclusive, set forth the average percent wood failure of panel specimens which were present in the mold cabinet for various periods of time and the average wood failure and breaking strength of dry samples for varying periods of time.

Table II sets forth the results obtained by testing a glue formulated as in Example 1 but containing no fungicidal agent.

Table III represents a glue formulated in accordance with Example 1 identified as batch B glue, said glue containing 4¼% of pentachlorophenol taken on the dry weight of the glue base.

Table IV sets forth the test results on panels made with glue formulated in accordance with Example 1 but containing triethyltin hydroxide, said glue being herein identified as batch C glue.

Table V sets forth the test results on panels made with glue formulated in accordance with Example 1 but containing triethyltin acetate as the fungicidal agent, said glue being herein identified as batch E glue.

Table VI is a composite table comparing the average wood failure results obtained when using plywood panels adhesively united by a glue containing pentachlorophenol; plywood panels adhesively united by a glue containing triethyltin hydroxide (batch C); plywood panels adhesively united by a glue containing triethyltin acetate (batch E); and plywood panels adhesively united with the glue of Example 1 but which contains no fungicidal agent.

Table II
GLUE FORMULATED IN ACCORDANCE WITH EXAMPLE 1 BUT CONTAINING NO FUNGICIDAL AGENT (CONTROL GLUE)

| Weeks exposed | Mold cabinet samples | | Dry samples | | Percent dry strength |
|---|---|---|---|---|---|
| | Average applied load in lbs. per square inch | Average percent wood failure | Average applied load in lbs. per square inch | Average percent wood failure | |
| 1 | 107 | 42 | 148 | 91 | 72.3 |
| 2 | 14 | 2 | 137 | 91 | 10.2 |
| 3 | 19 | 8 | 190 | 90 | 10.0 |
| 4 | 11 | 3 | 135 | 87 | 8.1 |
| 5 | 0 | 0 | 203 | 95 | 0 |
| 6 | 0 | 0 | 203 | 87 | 0 |
| 7 | 0 | 0 | 212 | 91 | 0 |
| 8 | 3 | 0 | 200 | 81 | 1.5 |
| 9 | 0 | 0 | 230 | 81 | 0 |
| 10 | 0 | 0 | 219 | 79 | 0 |
| 11 | 0 | 0 | 218 | 93 | 0 |
| 12 | 4 | 0 | 243 | 92 | 1.7 |
| Total | 158 | 55 | 2,338 | 1,058 | 103.8 |
| 12-week average | 13.2 | 4.6 | 194.8 | 88.2 | 8.7 |

Table III
RESULTS OBTAINED BY TESTING AS SET FORTH PANELS MADE WITH BATCH B GLUE COMPOSITION CONTAINING 4¼% PENTACHLOROPHENOL

| Weeks exposed | Mold cabinet samples | | Dry samples | | Percent dry strength |
|---|---|---|---|---|---|
| | Average applied load in lbs. per square inch | Average percent wood failure | Average applied load in lbs. per square inch | Average percent wood failure | |
| 1 | 116 | 66 | 126 | 90 | 84.2 |
| 2 | 116 | 50 | 141 | 94 | 82.3 |
| 3 | 66 | 34 | 155 | 93 | 42.6 |
| 4 | 113 | 56 | 211 | 95 | 53.5 |
| 5 | 59 | 25 | 192 | 97 | 36.8 |
| 6 | 62 | 24 | 143 | 93 | 43.5 |
| 7 | 104 | 54 | 189 | 95 | 55.0 |
| 8 | 93 | 41 | 189 | 92 | 49.2 |
| 9 | 74 | 45 | 203 | 96 | 36.5 |
| 10 | 88 | 49 | 202 | 100 | 43.6 |
| 11 | 119 | 78 | 142 | 97 | 83.8 |
| 12 | 95 | 51 | 131 | 95 | 72.5 |
| Total | 1,105 | 573 | 2,024 | 1,137 | 683.4 |
| 12-week average | 92.1 | 47.8 | 168.7 | 94.8 | 57.0 |

Table IV
RESULTS OBTAINED BY TESTING AS SET FORTH PANELS MADE WITH BATCH C GLUE COMPOSITION CONTAINING 0.174% TRIETHYLTIN HYDROXIDE

| Weeks exposed | Mold cabinet samples | | Dry samples | | Percent dry strength |
|---|---|---|---|---|---|
| | Average applied load in lbs. per square inch | Average percent wood failure | Average applied load in lbs. per square inch | Average percent wood failure | |
| 1 | 185 | 81 | 197 | 97 | 94.0 |
| 2 | 180 | 95 | 217 | 95 | 83.0 |
| 3 | 168 | 82 | 162 | 94 | 103.7 |
| 4 | 153 | 86 | 192 | 98 | 79.6 |
| 5 | 161 | 75 | 200 | 95 | 80.5 |
| 6 | 137 | 47 | 134 | 98 | 102.2 |
| 7 | 122 | 51 | 184 | 93 | 66.3 |
| 8 | 183 | 74 | 173 | 84 | 105.7 |
| 9 | 172 | 73 | 210 | 94 | 81.9 |
| 10 | 191 | 78 | 204 | 81 | 93.6 |
| 11 | 201 | 93 | 212 | 85 | 94.8 |
| 12 | 202 | 92 | 221 | 97 | 91.4 |
| Total | 2,055 | 927 | 2,306 | 1,111 | 1,076.7 |
| 12-week average | 171.3 | 77.3 | 192.2 | 92.6 | 89.7 |

Table V
RESULTS OBTAINED BY TESTING AS SET FORTH PANELS MADE WITH BATCH E GLUE COMPOSITION CONTAINING 0.174% TRIETHYLTIN ACETATE

| Weeks exposed | Mold cabinet samples | | Dry samples | | Percent dry strength |
|---|---|---|---|---|---|
| | Average applied load in lbs. per square inch | Average percent wood failure | Average applied load in lbs. per square inch | Average percent wood failure | |
| 1 | 116 | 92 | 239 | 80 | 44.4 |
| 2 | 133 | 67 | 241 | 92 | 55.2 |
| 3 | 89 | 69 | 200 | 87 | 44.5 |
| 4 | 131 | 68 | 239 | 87 | 54.9 |
| 5 | 130 | 65 | 196 | 89 | 66.4 |
| 6 | 99 | 34 | 187 | 96 | 52.9 |
| 7 | 114 | 60 | 192 | 95 | 59.3 |
| 8 | 86 | 38 | 236 | 91 | 36.4 |
| 9 | 101 | 47 | 231 | 97 | 43.7 |
| 10 | 172 | 79 | 279 | 93 | 61.6 |
| 11 | 171 | 80 | 219 | 93 | 78.1 |
| 12 | 130 | 68 | 230 | 97 | 56.5 |
| Total | 1,472 | 767 | 2,689 | 1,097 | 653.9 |
| 12-week average | 122.7 | 63.9 | 224.1 | 91.4 | 54.5 |

Table VI
SUMMARY OF RESULTS

| | Mold cabinet samples | | Dry samples | |
|---|---|---|---|---|
| | Average applied load in lbs. per square inch | Average percent wood failure | Average applied load in lbs. per square inch | Average percent wood failure |
| 4¼% pentachlorophenol | 92.1 | 47.8 | 168.7 | 94.8 |
| 0.174% triethyltin hydroxide | 171.3 | 77.3 | 192.2 | 92.6 |
| 0.174% triethyltin acetate | 122.7 | 63.9 | 224.1 | 91.4 |
| Non-toxic—no fungicidal agent | 13.2 | 4.6 | 194.8 | 88.2 |

It may be pointed out that the fungicidal activity of triethyltin hydroxide is greatly superior to the fungicidal activity of the remainder of the compounds set forth in the tables, it being further pointed out that all of the organo-tin compounds herein set forth do have good fungicidal activity, and moreover the aqueous solution of the glue is stabilized so that it is not necessary to add a thinning agent or a thickening agent as has been previously necessary in the art when using glues of the character herein set forth, said glues rapidly becoming thicker after mixing or rapidly becoming thinner after mixing.

In addition to the particular organo-tin compounds hereinbefore mentioned and having the formula $R_3SnX$, the following fungicidal organo-tin compounds may be incorporated in the glue base or in the glue composition:

Triethyltin p-nitro-phenoxide having the formula
$$(C_2H_5)_3SnO\text{---}C_6H_4.NO_{2(p)}$$

Triethyltin methane-sulphonamide having the formula
$$(C_2H_5)_3SnNH.SO_2.CH_3$$

Triethyltin toluene-p-sulphonamide having the formula
$$(C_2H_5)_3SnNH.SO_2.C_6H_4.CH_{3(p)}$$

N-triethylstannyl-phthalimide having the formula

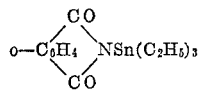

In the general formula $R_3SnX$ in which R is an alkyl radical, an aryl radical, an alkaryl radical, or an aralkyl radical, all of the R radicals attached to the same tin atom need not be of the same species. In other words, each R is independently selected from the group consisting of alkyl radicals, aryl radicals, alkaryl radicals, and aralkyl radicals.

Another way of expressing this is by the formula:

wherein $R_1$, $R_2$, and $R_3$ are selected from the group consisting of alkyl radicals, aryl radicals, alkaryl radicals, and aralkyl radicals. Examples of such compounds are diethylphenyltin acetate or diethyl-p-bromophenyltin acetate. In each case R is directly linked to the tin by a tin carbon bond.

Alkyl, aryl, alkaryl, and aralkyl as used herein include substituted alkyl, aryl, alkaryl, and aralkyl as exemplified by diethyl-p-bromophenyltin acetate.

Although the invention is not limited thereto, desirably R may have 1 to 8 carbon atoms therein. For example, the methyl radical has 1 carbon atom; the ethyl radical 2; the propyl radical 3; the butyl radical 4; the hexyl radical 6; and the octyl radical 8.

EXAMPLE 2

The following is an example illustrative of the present invention as applied to a soya bean flour soluble blood glue base. In this example, 3 glue mixes were prepared designated respectively as F, G and H, glue mix F containing no fungicide. Glue mix G contained as a fungicide pentachlorophenol, that is, a penta-substituted phenol ring with 5 chlorine atoms. Glue H contained as a fungicide triethyltin hydroxide in the amount of 0.17% taken on the dry weight of the soya bean flour blood glue base. The soya bean flour blood glue base had the following composition:

| | Percent (about) |
|---|---|
| Soya bean flour | 54 |
| Whole soluble blood, which has been spray dried | 34 |
| Wood flour | 8 |
| Sodium fluoride | 1 |
| Antifoaming agent | 3 |

The soya bean flour is a solvent-extracted finely ground soya flour. The manner in which an adhesive composition was prepared utilizing the above specified glue base powder is set forth in the following under the heading "Glue Mix F":

GLUE MIX F

| | Gms. |
|---|---|
| Water (at 70° F.) | 1000 |
| Pine oil | 16 |
| Soya flour blood glue base as above set forth | 680 |

Mix 5 minutes.

| | |
|---|---|
| Water (at 70° F.) | 1760 |

Mix 1 minute.

| | |
|---|---|
| Lime | 44 |
| In water | 88 |
| Rinse water | 100 |

Mix 1 minute.

| | |
|---|---|
| 50% NaOH sol | 104 |

Mix 1 minute.

| | |
|---|---|
| Sodium silicate (N grade) | 240 |

Mix 5 minutes.

The following Glue Mix G was prepared using the above specified soya bean flour blood glue base:

GLUE MIX G

| | Gms. |
|---|---|
| Water (at 70° F.) | 1000 |
| Pine oil | 16 |
| Soya flour blood glue base as above set forth | 680 |

Mix 5 minutes.

| | |
|---|---|
| Water (at 70° F.) | 1820 |

Mix 1 minute.

| | |
|---|---|
| Lime | 44 |
| In water | 88 |
| Rinse water | 100 |

Mix 1 minute.

| | |
|---|---|
| Sodium silicate (N grade) | 240 |

Mix 1 minute.

| | |
|---|---|
| 50% NaOH Sol. | 104 |

Mix 2 minutes.

| | |
|---|---|
| Pentachlorophenol | 28.9 |

Mix 5 minutes.

The following Glue Mix H was prepared using the above specified soya bean flour blood glue base:

GLUE MIX H

| | Gms. |
|---|---|
| Water (at 70° F.) | 1000 |
| Pine oil | 16 |
| Soya flour blood glue base as above set forth | 680 |

Mix 5 minutes.

| | |
|---|---|
| Water (at 70° F.) | [1] 1730.4 |

Mix 1 minute.

| | |
|---|---|
| Lime | 44 |
| In water | 88 |
| Rinse water | 100 |

Mix 1 minute.

| | |
|---|---|
| 50% NaOH sol. | 104 |

Mix 1 minute.

| | |
|---|---|
| Sodium silicate (N grade) | 240 |

Mix 2 minutes.

Triethyltin hydroxide, 29.6 gms. of a 4% sol. in water.

[1] Water reduced to compensate for the water added with the triethyltin hydroxide.

Each of the above batches F, G, and H was tested for MacMichael viscosity (MM) and high shear viscosity (HS) upon mixing, one hour after mixing, and again two hours after mixing. The following Table VII sets forth the viscosities obtained:

Table VII

|  | Glue F, no fungicide | | Glue G, pentachlorophenol | | Glue H, triethyltin hydroxide | |
| --- | --- | --- | --- | --- | --- | --- |
|  | MM | HS | MM | HS | MM | HS |
| Initial | 42 | 3.5 | 75 | 5.3 | 60 | 4.1 |
| 1 hour | 141 | 4.1 | 64 | 4.7 | 161 | 4.3 |
| 2 hours | 116 | 3.9 | 73 | 4.2 | 106 | 4.1 |

It is to be noted that the one-hour and two-hour MM viscosity for Glue G containing pentachlorophenol is relatively low as compared with the one-hour and two-hour MM viscosity for Glue H. The MM viscosities were determined on a MacMichael viscometer rotating at 20 r.p.m. using a #26 wire; and the high shear viscosities (HS) were determined on the Hercules High Shear Viscometer, rotating at 1300 r.p.m.

The above described glue mixes were spread on standard laboratory veneer, 3/16 of an inch thick and measuring 12" by 12". A face and a back piece were then assembled to the spread core forming a 3-ply plywood panel, 7/16 of an inch thick. The assembled panels were placed two in each press opening and pressed at 200 pounds per square inch panel pressure for 5.2 minutes at a platen temperature of 260° F. The panels were subsequently sawed into 1" x 3" standard plywood test specimens and ½ of the specimens placed in a mold cabinet and thereby exposed to the action of protein destroying molds. The other half of the chips were retained under non-molding conditions and provided a reference standard. Each week chips were withdrawn from the mold cabinet and broken in a standard plywood shear strength machine and compared with the corresponding chips which had been retained in a non-molding condition. Referring to FIG. 1 of the drawings, the results obtained are shown as the percentage of dry strength achieved by the mold chips versus the weeks exposed in the mold cabinet. The graph set forth in FIG. 1 shows that Glue F which was not protected by any fungicide failed rapidly under the action of the molds. Glues G and H protected respectively by pentachlorophenol and triethyltin hydroxide retained considerably higher strengths over the same period of time than the non-protected glue. The graph discloses that excellent strength results are obtained when using triethyltin hydroxide, said results being fully equivalent to that obtained when using pentachlorophenol as the fungicidal agent. However, it is to be noted that instead of using 4.25% of the pentachlorophenol taken on the soya bean blood glue base, that only 0.17% of the triethyltin hydroxide was used. Further, the pentachlorophenol glue would require the addition to the glue mix of a thickening agent to compensate for the decrease in viscosity, the triethyltin hydroxide did not produce any decrease in viscosity and hence no thickening agent was necessary in order to produce a glue which would have the proper viscosity when applied to the plywood core so that the glue stayed on the glue line.

EXAMPLE 3

The following is an example illustrative of the present invention as applied to a casein glue base wherein it is desirable to maintain a rapid gelation characteristic in order to develop rapid bond strength and thus permit early removal of the clamps. This example illustrates the retention of this rapid gelation characteristic when an organo tin compound is used as contrasted with a chlorinated phenol wherein the gelation characteristic is materially reduced.

The casein glue base was prepared by intimately mixing together the following dry ingredients:

| | Parts by weight |
| --- | --- |
| Lactic casein, 50–60 mesh | 58.0 |
| Antifoam | 5.0 |
| Solvent extracted soya bean flour | 11.3 |
| Lime | 14.0 |
| Trisodium phosphate | 6.5 |
| Sodium fluoride | 4.0 |
| Boric acid | 1.0 |

The dry casein glue base prepared as above set forth was divided into three portions and labelled "mix 2," "mix 7," and "mix 12." To mix 2, no fungicidal agent was added. To mix 7, 0.2% of triethyltin acetate was added. To mix 12, 2.5% of sodium trichlorophenate was added.

Figure 2:
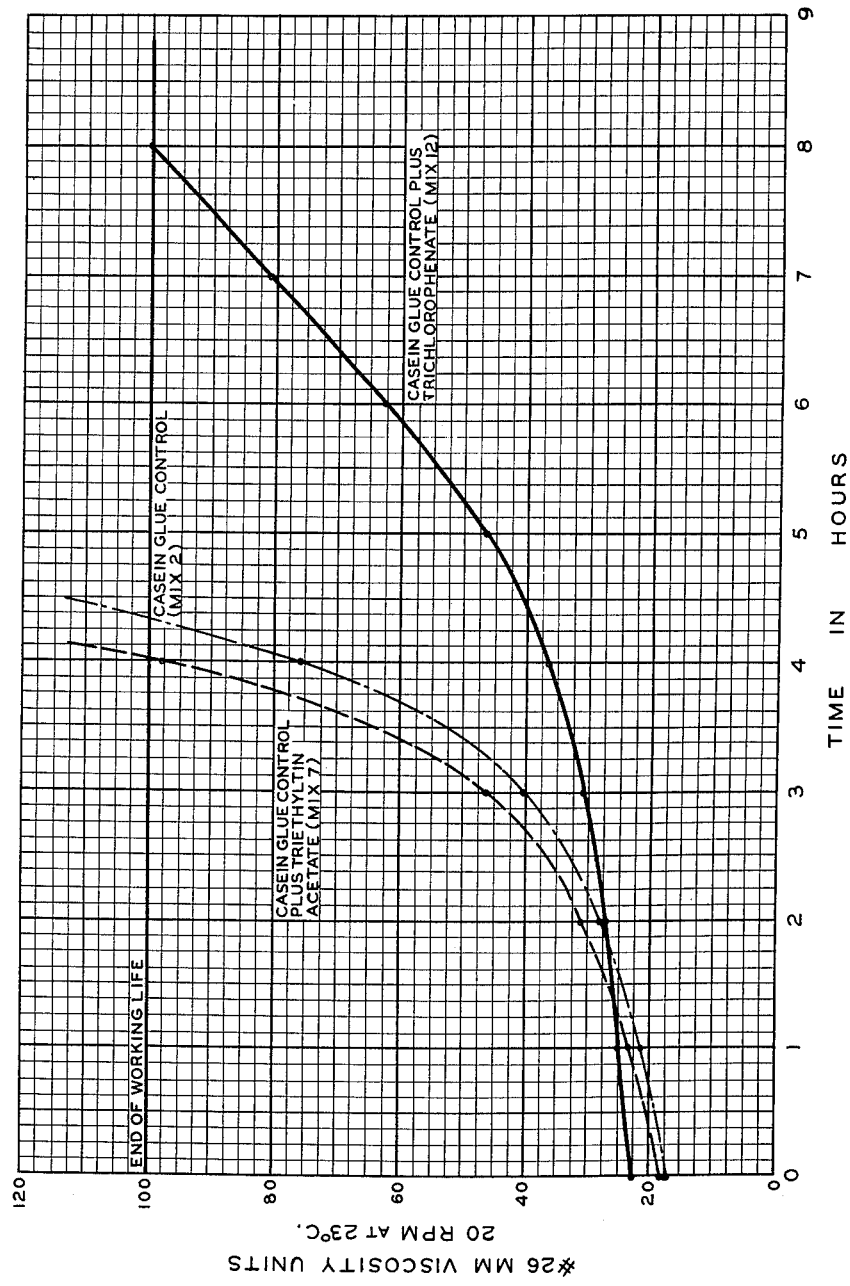

The three dry glues were then used to prepare three wet glues by adding to each dry glue mix 212 grams of water for each 100 grams of the dry glue base. After thorough mixing, the viscosities of the resulting liquid glues or adhesive compositions were measured over a period of time of 7 hours. Referring to FIG. 2 of the drawings, the graph therein set forth shows viscosity versus time results. Here again, the viscosity was measured with a #26 MM wire in a MacMichael viscometer rotating at 20 r.p.m.

Mix 12 containing sodium trichlorophenate had a higher initial MM viscosity with a gradually increasing slope indicating a slow gel formation. The control mix 2 and the triethyltin acetate mix 7 both started with a low viscosity, but showed a rapid gel formation as indicated by the rapidly increasing slope. It is desired to point out that in order to obtain adequtae protection from molds, it was necessary to add 2½% of sodium trichlorophenate, whereas it was only necessary to add 0.2% of the triethyltin acetate. Moreover, the triethyltin acetate caused materially less alteration in the viscosity properties of the glue mix than that caused by the addition of trichlorophenate. The triethyltin acetate did not decrease the viscosity of the glue mix after a predetermined length of time as, for example, 3 to 6 or 7 hours. Therefore, it was not necessary to add a thickening agent to the trichlorophenate mix to obtain proper working viscosity. Further, in all of the examples herein set forth, the organo-tin compounds do not have any deleterious effect upon the adhesive conditioner which is added to the liquid glue mix to improve the adhesive properties of the final glue or adhesive composition. In this particular example, the triethyltin acetate has no deleterious effect upon the lime, trisodiumphosphate, sodium fluoride, or upon the in-situ-generated products resulting when the glue base or powder containing said compounds are mixed with water to provide an aqueous adhesive composition.

EXAMPLE 4

The following is an example illustrative of the present invention as applied to a soluble blood-urea resin adhesive composition. In the present example, 150 grams of water were mixed with 120 grams of a powder which contained about 90% of spray-dried soluble blood. There was added to the mixture a small amount of an antifoam constituent. The resulting mass was then mixed two minutes and 260 grams of water at 212° F. were added, and the resulting mass mixed for 5 minutes. Thereafter, 255 grams of water at 60° F. were added, more antifoam was added, and then 20 grams of N-grade sodium silicate was introduced into the mixture. The resulting mass was then mixed for two minutes and 200 grams of wheat flour was added. The resulting mass was then mixed for 5 minutes and water having a temperature of 60° F. was added in the amount of 125 grams. The resulting mass was then mixed for two minutes and urea-formaldehyde resin was added in the amount of 250 grams. The resulting mass was again mixed for 5 minutes.

There was finally produced a liquid glue mix which was divided into two portions herein identified as portion #1 and portion #2. To portion #2 triethyltin acetate was added in an amount of 0.174% based on the total weight of the soluble blood powder and the wheat flour. The resulting mixture was then stirred until the triethyltin acetate was thoroughly dispersed therein. Portion #1 functioned as the control and did not carry any fungicide. The liquid glue mix #1 and the liquid glue mix #2 were tested for MM viscosity in the manner hereinbefore specifically set forth. The results of this test appear in the following Table VIII:

*Table VIII*

|  | Liquid glue mix #1, no fungicide | Liquid glue mix #2, triethyltin acetate |
|---|---|---|
| Initial | 37 | 37 |
| 1 hour | 40 | 40 |
| 1½ hour | 40 | 39 |

The above data shows that triethyltin acetate when added to a blood-urea resin adhesive composition causes no alteration in the viscosity of the composition, the difference between 39 and 40 being within the experimental error of the instrument.

Moreover, when a blood-urea resin adhesive composition is used to produce a consolidated product, the latter resists the growth and deteriorating effect of microorganisms at the glue line under conditions promoting said growth.

EXAMPLE 5

The following is an example illustrative of the present invention as applied to a starch corrugating adhesive composition. In the present example, 100 grams of pearl starch was mixed with 500 grams of water. After mixing for a period of one minute, there was added 50 ml. of a 10° solution of sodium hydroxide. The mixture was then heated to 165° F. and agitation was continued at said temperature for a period of 10 minutes. Then 600 grams of water at a temperature of 60° F. was added, and the resulting mass agitated for a period of two minutes. Thereafter, starch was again added in the amount of 400 grams and the resulting mixture was agitated for a period of 30 minutes. The finally produced mix was divided into two portions. The first portion functioned as a control mix. To portion #2 there was added 0.174% of triethyltin acetate, said percentage being taken on the total amount of starch in the mixture reduced to a dry basis.

Portion #1 and portion #2 were subjected to viscosity tests and the results thereof are set forth in the following Table IX:

*Table IX*

|  | Liquid glue mix #1, no fungicide | | Liquid glue mix #2, triethyltin acetate | |
|---|---|---|---|---|
|  | MM | HS | MM | HS |
| Initial | 161 | ---- | 195 | ---- |
| 1 hour | 180 | ---- | 225 | ---- |
| 2 hours | 183 | 5.0 | 230 | 5.0 |

The portion of the liquid glue mix containing the triethyltin acetate showed only a slight but non-significant thickening of the mix due to the addition of the organo-tin salt with adequate viscosity stability over a two-hour period. When a starch-organo tin compound glue is used to produce a consolidated product, the latter resists the growth and deteriorating effect of microorganisms at the glue line under conditions promoting said growth.

EXAMPLE 6

The following is an example illustrative of the present invention as applied to a cold press soya bean flour adhesive. Specifically, the glue base powder used in preparing the adhesive composition comprised between 94 and 95% of finely ground solvent-extracted soya bean flour containing a small amount of sodium carbonate and a small amount of sodium fluoride together with an antifoam material. This powder was made into a glue mix by mixing with water, lime, sodium hydroxide, and sodium silicate. The original batch was split into two portions. Portion #1 did not have any fungicide added thereto. Portion #2 had added thereto 2% of triethyltin hydroxide. Portions #1 and #2 were tested for MM and high shear viscosities and the results of said tests appear in the following Table X:

*Table X*

|  | Liquid glue mix #1, no fungicide | | Liquid glue mix #2, 2% triethyltin hydroxide | |
|---|---|---|---|---|
|  | MM | HS | MM | HS |
| Initial | 113 | 5.3 | 117 | 5.8 |
| 1 hour | 167 | 7.6 | 177 | 6.8 |
| 2 hours | 220 | 7.7 | 244 | 7.1 |

The data set forth in Table X shows that there is very little difference between the MM viscosity of glue mix #2 and glue mix #1 after initially mixing, after a period of one hour, and after a period of two hours.

EXAMPLE 7

A cold press soya bean flour adhesive composition was prepared in the same manner as prepared in Example 6. This adhesive composition was divided into six portions. Portion #1 contained no fungicide and functioned as the control glue composition. Portion #2 had added thereto 4¼% of pentachlorophenol. Portions #3, #4, #5, and #6 had added thereto respectively 0.174%, 0.348%, 0.700%, and 1.000% triethyltin hydroxide. These portions were tested for MM and high shear viscosities and the results thereof appear in Table XI:

*Table XI*

|  | Liquid glue mix #1, no fungicide | | Liquid glue mix #2, 4¼% pentachlorophenol containing additional water to control viscosity | | Liquid glue mix #3, 0.174% triethyltin hydroxide | |
|---|---|---|---|---|---|---|
|  | MM | HS | MM | HS | MM | HS |
| 1 hour | 138 | 6.4 | 168 | 6.9 | 129 | 6.6 |
| 2 hours | 180 | 6.5 | 205 | 7.2 | 174 | 6.4 |

|  | Liquid glue mix #4, 0.348% triethyltin hydroxide | | Liquid glue mix #5, 0.700% triethyltin hydroxide | | Liquid glue mix #6, 1.000% triethyltin hydroxide | |
|---|---|---|---|---|---|---|
|  | MM | HS | MM | HS | MM | HS |
| 1 hour | 112 | 6.0 | 137 | 6.2 | 133 | 6.3 |
| 2 hours | 148 | 6.2 | 205 | 6.5 | 247 | 6.4 |

The above Table XI sets forth the effect on viscosity of increasing amounts of triethyltin hydroxide on the soya bean flour adhesive composition. The triethyltin hydroxide covers the range from 0% to 1% based on the dry weight of the glue base powder. Liquid glue mix #2 to which 4¼% of pentachlorophenol was added, required adjustment with additional water to permit the addition of pentachloropenol and still maintain a usable viscosity. Heretofore it has been stated that it is unnecessary to add this additional water when an organo-tin compound was used, and especially when the tin compound has the formula $R_3SnX$ since the organo-tin compounds cause little or very minor changes in the MM viscosity and, in general, the same holds true for the high shear viscosities. As the amount of the triethyltin hydroxide increases in the liquid glue mix, the one-hour MM viscosities of the glues remain quite constant. It is to be noted that the one-hour MM viscosity of the liquid glue mix which contains the organo-tin compound is substantially lower than the one-hour MM viscosity of a glue mix which is identical except that in the latter the fungicide is pentachlorophenol instead of the organo-tin compound.

Consolidated cellulose units bonded with the above set forth soya bean base adhesive composition resists the growth and deteriorating effect of microorganisms at the glue line.

Plywood panels made with cold press glues as herein set forth were prepared by pressing at room temperature, that is, around about 70° F., at 185 pounds per square inch panel pressure for 15 minutes. At the end of 15 minutes, the panels were removed from the press and allowed to stand in the stack three days before sawing and testing. The panels produced from hot press adhesive composition were prepared by pressing at 200 pounds per square inch panel pressure, two panels per opening, for 5.2 minutes with a platen temperature of 260° F. The glues herein set forth function well as no-clamp glues.

While the most satisfactory results are obtained by bonding cellulose units, including sheet-like units, or lignocellulose units, with a bond having present a fungicidal organo-tin compound having the formula $R_3SnX$ as herein defined, any fungicidal organo-tin compound having a tin carbon bond including those where the hydrocarbon radical or the substituted hydrocarbon radical is linked to the tin atom by a tin carbon bond, may be an ingredient of the adhesive composition which produces the set glue bond, said organo-tin compound being characterized by the property of producing little or a minimum variation in the viscosity of the aqueous glue adhesive composition after a predetermined time has elapsed after mixing thereby eliminating the necessity of adding to the adhesive composition a viscosity compensating agent which will either increase or decrease the viscosity of the adhesive composition.

As previously pointed out, the adhesive composition carrying the organo-tin compound may have present an adhesive conditioner comprising an alkali metal compound typified by an alkali metal hydroxide including sodium, potassium, or lithium hydroxide, or an alkali metal carbonate as, for example, sodium carbonate or bicarbonate, or a mixture of the alkali metal hydroxide and the alkali metal carbonate. Further, the adhesive composition may have added thereto in addition to the alkali metal compound conditioner, an alkali metal silicate as, for example, sodium, potassium or lithium silicate, and the further conditioner, lime or its equivalent.

The dry adhesive of the invention containing the organo-tin compound has very good storage life. Even when stored over periods as long as six months, the adhesive composition maintained its excellent viscosity and fungicidal properties.

More specifically, when the dry glue base used in carrying out the present invention has incorporated therein any of the tin compounds herein set forth, the dry composition after a period of six months' storage upon its admixture with water and conversion into a liquid adhesive bonding agent, showed substantially the same viscosity, fungicidal and adhesive properties as a freshly prepared substantially identical adhesive composition.

In accordance with the present invention, a consolidated fiberboard product may be produced which resists the growth and deteriorating effect of microorganisms under conditions which promote such growth, the fibers of said consolidated product being coated with an adhesive material containing an organo-tin compound of the character herein set forth, said adhesive bond being protected from attack by microorganisms.

In carrying out the present invention and in producing the consolidated product, the adhesive material with which the cellulose units are coated may have a water content which may vary broadly between the limits of 1:1 and 1:7, and more narrowly may vary between the limits of 1:3 and 1:5. The organo-tin compound used in carrying out the present invention may be enclosed in small capsules and may be introduced into the dry glue base material when the latter is in the glue mixer or the capsulated material may be wholly or partially compounded with a batch of wet glue just prior to spreading on the wood veneer.

The proteinaceous materials to which this invention is particularly applicable, includes proteins of animal and vegetable origin, as well as mixtures thereof, and which are soluble in alkaline media. The vegetable proteinaceous materials include flours derived from the seeds of soya bean, peanut, cottonseed, linseed, sesame seed, caster beans and the like. The animal proteinaceous materials include, in addition to milk casein and hide and bone glues, blood albumin derived from slaughter house operation. In the plywood industry, soy bean flour is by far the source of the largest amount of vegetable proteinaceous material and this is normally of the type known as solvent-extracted, as distinguished from the type obtained by expeller mill extraction processes. Such soy bean meal is characterized by having a water-solubility of a relatively high order, in comparison to the expeller meal or flour, due to the fact that in solvent-extraction relatively little denaturation or insolubilization of protein content takes place. In carrying out the present invention, mixtures of proteinaceous materials of animal and vegetable order may be used to produce adhesives and exhibit substantially the same properties in adhesive compositions as do adhesives compounded from one or the other source of protein material.

The MacMichael viscosity, herein abbreviated as MM, may be defined as follows: the viscosity reading in rotational units which a sample produces when tested with a No. 26 wire spindle in a MacMichael rotating viscometer which turns at 20 r.p.m. The spindle used in carrying out the different viscosity tests is the standard MacMichael spindle, 9.4 mm. in diameter and immersed 4.8 centimeters in the material being tested.

The high shear viscosity may be defined as the viscosity reading in centimeters produced on a Hercules high shear viscometer turning at a rate of 1300 r.p.m.

In Example 3, the sodium trichlorophenate is the unsymmetrical 2,4,5 sodium trichlorophenate.

What is claimed is:

1. An adhesive composition comprising a vegetable protein glue base normally exhibiting, in its set state, under humid conditions of use, a tendency to deteriorate by attack of living organisms, and a fungicidal agent inhibiting said tendency to deteriorate, the latter being present in the adhesive composition in an amount between the limits of about 0.01% and about 2% taken on the dry weight of the glue base, said adhesive composition containing an alkaline adhesive conditioner, said fungicidal agent comprising an organo-tin compound selected from the group consisting of triethyltin p-nitro-phenoxide; triethyltin methane-sulphonamide; triethyltin toluene-p-sulphonamide; N - triethylstannyl - phthalimide and compounds of the formula $R_3SnX$ where R is a radical linked directly to the tin radical by a tin-carbon bond and each R is independently selected from the group consisting of alkyl, aryl, alkaryl, and aralkyl radicals, and X is an anion free of any tin carbon linkage, an aqueous dispersion of said adhesive material containing said organo-tin compound having substantially the same viscosity characteristics as said adhesive material without said organo-tin compound.

2. An adhesive composition comprising a vegetable protein glue base normally exhibiting, in its set state, under humid conditions of use, a tendency to deteriorate by attack of living organisms, a fungicidal agent inhibiting said tendency to deteriorate, the latter being present in the adhesive composition in an amount between the limits of about 0.01% and about 2% taken on the dry weight of the glue base, said adhesive composition containing an adhesive conditioner comprising an alkali metal caustic, lime, and sodium silicate, said fungicidal agent comprising an organo-tin compound selected from the group consisting of triethyltin p-nitro-phenoxide; triethyltin methane-sulphonamide; triethyltin toluene-p-sulphonamide; N-triethylstannyl-phthalimide and compounds of the formula $R_3SnX$ where R is a radical linked directly to the tin radical by a tin-carbon bond and each R is independently selected from the group consisting of alkyl, aryl, alkaryl, and aralkyl radicals, and X is an anion free of any tin carbon linkage, an aqueous dispersion of said adhesive material containing said organo-tin compound having substantially the same viscosity characteristics as said adhesive material without said organo-tin compound.

3. A dry adhesive composition having a storage life of at least six months comprising a vegetable protein glue base normally exhibiting in its set state under humid conditions of use, a tendency to deteriorate by attack of living organisms, and a fungicidal agent inhibiting said tendency to deteriorate, the latter being present in the adhesive composition in an amount between the limits of about 0.01% and about 2% taken on the dry weight of the glue base, said fungicidal agent comprising an organo-tin compound selected from the group consisting of triethyltin p-nitro-phenoxide; triethyltin methane-sulphonamide; triethyltin toluene-p-sulphonamide; N-triethylstannyl-phthalimide and compounds of the formula $R_3SnX$ where R is a radical linked directly to the tin radical by a tin-carbon bond and each R is independently selected from the group consisting of alkyl, aryl, alkaryl, and aralkyl radicals, and X is an anion free of any tin carbon linkage, an aqueous dispersion of said adhesive material containing said organo-tin compound having substantially the same viscosity characteristics as said adhesive material without said organo-tin compound.

4. The process of bonding lignocellulose sheet materials with an adhesive material having a glue base to produce a consolidated product which resists the growth and deteriorating effects of microorganisms at the glue line, under conditions promoting such growth, the viscosity characteristics of said adhesive material normally sufficiently changing upon the addition of a fungicide to require the addition of a viscosity compensating agent, which comprises coating at least one of two opposed surfaces of lignocellulose sheet materials with an aqueous dispersion of said adhesive material containing an organo-tin compound having a tin-carbon bond, said organo-tin compound not sufficiently affecting the viscosity characteristics of said adhesive material to require the addition of a viscosity compensating agent, and then consolidating the sheets and setting the adhesive material thereby bonding the sheets and protecting the set adhesive material against attack from said microorganisms, said adhesive material comprising a glue base selected from the group consisting of starch and proteinaceous material, said organo-tin compound being selected from the group consisting of triethyltin p-nitro-phenoxide; triethyltin methane-sulphonamide; triethyltin toluene-p-sulphonamide; N-triethylstannyl-phthalimide and compounds of the formula $R_3SnX$ where R is a radical linked directly to the tin radical by a tin-carbon bond and each R is independently selected from the group consisting of alkyl, aryl, alkaryl, and aralkyl radicals, and X is an anion free of any tin carbon linkage.

5. The process as defined in claim 4 wherein the glue base comprises a vegetable protein.

6. The process as defined in claim 5 wherein the organo-tin compound has the formula $R_3SnX$ where R is a radical linked directly to the tin radical by a tin-carbon bond and each R is independently selected from the group consisting of alkyl, aryl, alkaryl, and aralkyl radicals, and X is an anion free of any tin carbon linkage.

7. The process defined in claim 6 in which the organo-tin compound is present in the adhesive material in an amount between the limits of about 0.01% and about 2% taken on the dry weight of the glue base.

8. The process defined in claim 7 in which the organo-tin compound is a triethyltin compound.

9. The process defined in claim 7 in which the organo-tin compound is a tributyltin compound.

10. The process defined in claim 6 in which the organo-tin compound is present in the adhesive material in an amount between the limits of about 0.01% and about 0.5% taken on the dry weight of the glue base.

11. The process defined in claim 6 in which R has from 1 to 8 carbon atoms therein.

12. The process defined in claim 6 in which the sheets of lignocellulose material are bonded under heat and pressure.

13. The process defined in claim 6 in which the glue base is a soya flour base.

14. The process defined in claim 6 in which the glue base is a soya-flour-soluble-blood-glue base.

15. The process defined in claim 6 in which the sheets of lignocellulose material are bonded under pressure at approximately room temperature.

16. The process as defined in claim 6 wherein the sheet materials are plywood members.

17. A plurality of cellulose units, the members of which are bonded at the glue line with a set adhesive material comprising a glue base selected from the group consisting of starch and proteinaceous materials, said adhesive material resisting at the glue line the growth and deteriorating effects of microorganisms of the class consisting of bacteria and fungi, said set adhesive material containing an organo-tin compound selected from the group consisting of triethyltin p-nitro-phenoxide; triethyltin methane-sulphonamide; triethyltin toluene-p-sulphonamide; N-triethylstannyl-phthalimide and compounds of the formula $R_3SnX$ where R is a radical linked directly to the tin radical by a tin carbon bond and each R is independently selected from the group consisting of alkyl, aryl, alkaryl, and aralkyl radicals, and X is an anion free of any tin carbon linkage, an aqueous dispersion of said adhesive material containing said organo-tin compound having substantially the same viscosity characteristics as said adhesive material without said organo-tin compound.

18. An article as defined in claim 17 wherein the glue base comprises a vegetable protein.

19. An article as defined in claim 18 wherein the cellulose units comprise plywood members and the article is a plywood panel.

20. The plywood panel defined in claim 19 in which the organo-tin compound is present in the set adhesive material in an amount between the limits of about 0.01% and about 2% taken on the dry weight of the glue base.

21. An article as defined in claim 18 wherein the article is a fiberboard, the fibers of which are bonded together with said adhesive material.

References Cited in the file of this patent

UNITED STATES PATENTS

| | | |
|---|---|---|
| 2,103,153 | Dunham | Dec. 21, 1937 |
| 2,291,586 | Galber et al. | July 28, 1942 |
| 2,521,720 | Hill | Sept. 12, 1950 |
| 2,637,675 | Bain | May 5, 1953 |
| 2,685,523 | Cross et al. | Aug. 3, 1954 |
| 2,772,263 | Yeager | Nov. 27, 1956 |
| 2,784,106 | Christian et al. | Mar. 5, 1957 |
| 2,788,305 | Sheeran | Apr. 9, 1957 |
| 2,844,482 | Maskey | July 22, 1958 |

FOREIGN PATENTS

| | | |
|---|---|---|
| 734,119 | Great Britain | July 27, 1955 |

OTHER REFERENCES

Journal of Applied Chemistry for June 4, 1954, article by G. J. M. Van de Kerk et al., pages 314–319.